3,244,702
Patented Apr. 5, 1966

3,244,702
TETRAZINE COMPOUNDS
Henry J. Marcus, West Covina, Calif., assignor to Aerojet-General Corporation, Azusa, Calif., a corporation of Ohio
No Drawing. Filed Feb. 7, 1963, Ser. No. 258,374
20 Claims. (Cl. 260—241)

This invention relates to the preparation of derivatives of 1,2,4,5-tetrazine. More specifically, this invention deals with the production of novel 3,6 substituted 1,2,4,5-tetrazines, preferably called 3,6 substituted s-tetrazines.

It is an object of this invention to provide novel derivatives of s-tetrazine and methods for their preparation. The novel compounds of this invention have use as explosives and as monomers for polymerization to high energy binders with aldehydes and/or boron containing compounds. They are also useful as intermediates for the synthesis of other tetrazines.

The basic compounds of the invention are produced by reacting 3,6-diamino-s-tetrazine with hydrazine to form either the monohydrazino or 3,6-dihydrazino-s-tetrazine. These compounds are the first members in the series of compounds of this invention from which further members may be derived.

The general reaction scheme proceeds as follows:

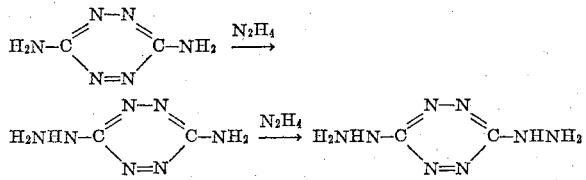

In general, the reaction of 3,6-diamino-s-tetrazine with hydrazine may be carried out at temperatures between about 0° and about 40° C. The pressure under which the process is carried out is not critical. Preferably, however, the process is conducted at atmospheric pressure or slightly higher although pressures up to 500 atmospheres may be employed if desired.

An excess of hydrazine—more than 2 moles per mole of 3,6-diamino-s-tetrazine—is employed to form the solid 3,6-dihydrazino-s-tetrazine. An excess is employed from about 5 to about 30 moles hydrazine per mole of s-tetrazine so that the hydrazine also acts as the solvent for the reaction. When producing 3-amino-6-hydrazino-s-tetrazine only a slight excess, about 5 percent hydrazine over the one mole hydrazine per mole of 3,6-diamino-s-tetrazine, may be used and an additional solvent such as an alcohol or dioxane is generally employed. The solid products may be recovered by any of the common liquid-solid separation means such as decantation, filtration or centrifugation.

EXAMPLE I 15 g. (0.134 mole) of crude 3,6-diamino-s-tetrazine was suspended in a mixture of 82 ml. hydrazine (approximately 2.5 moles) in a 500 ml. round bottom flask. After stirring at 20±5° C. for four hours, no starting material remained. The volume of the dark brown solution was 100 ml. The hydrazine and methanol were removed under vacuum and the residue treated with 25 ml. cold water. After standing overnight, the solid was filtered and washed, first with ice water, then with alcohol. The dried crude 3,6-dihydrazino-s-tetrazine weighed 6.8 g.

3 g. of crude 3,6-hydrazino-s-tetrazine was dissolved in 80 ml. dimethylsulfoxide at 60°–80° C. The hot, deep red solution was filtered through cotton and diluted, first with 50 ml. hot ethanol which was added in a thin stream with stirring and then with 30 ml. cold 2-propanol. The addition of the alcohol caused immediate precipitation of 3,6-dihydrazino-s-tetrazine as glistening red crystals. The mixture was chilled to 10°–15° C. with stirring and the product filtered and washed with a few ml. of a 50-50 mixture of dimethylsulfoxide and 2-propanol. After a second recrystallization, which was carried out similarly, the dark red crystalline product weighed 2.0 g. (67% recovery). It melted at 160°–162° C. with decomposition.

| Formula | Carbon, percent | Hydrogen, percent | Nitrogen, percent |
|---|---|---|---|
| $C_2H_6N_8$: | | | |
| Calculated | 16.90 | 4.26 | 78.84 |
| Found | 16.81, 16.76 | 4.19, 4.27 | 79.17, 78.92 |

When only 5 ml. (approximately .15 mole) of hydrazine in the presence of methanol as a diluent is used rather than the excess hydrazine stated above 3-amino-6-hydrazino-s-tetrazine is produced.

An alternate and simpler method of isolation of the crude s-tetrazine compound consists of quenching the reaction mixture by the addition of 3 to 5 volumes of cold water followed by filtration and washing as described but yields are slightly lower.

*Derivatives of 3-amino-6-hydrazino-s-tetrazine and 3,6-dihydrazino-s-tetrazine*

Derivatives of 3-amino-6-hydrazino-s-tetrazine and 3,6-dihydrazino-s-tetrazine may be prepared in various manners.

Monoacid salts or diacid salts may be prepared by reacting a strong mineral acid with the corresponding s-tetrazine. Acids which may be employed include hydrochloric, hydrobromic, sulfuric and nitric.

When about 1 mole of acid is employed per mole of s-tetrazine the monoacid is produced whereas 2 moles of acid per mole of s-tetrazine will give a diacid salt. When a diacid is desired a large excess of acid may be employed. The temperature of mono or diacid formation may range from about 0° to about 20° C.

EXAMPLE II 5 g. (0.035 mole) of crude 3,6-dihydrazino-s-tetrazine was added slowly to 20 ml. concentrated hydrochloric acid at 5°–10° C. The temperature rose to 20° C. After agitation, the mixture was chilled below 10° C., filtered and washed, first with 15 ml. cold concentrated hydrochloric acid and then with two 15 ml. portions of 2-propanol. The air-dried orange 3,6-dihydrazino-s-tetrazine dihydrochloride product weighed 4.8 g. (64% of theory). The salt was purified by recrystallization, first from 45% aqueous 2-propanol and then from 4 N hydrochloric acid. It was found by analysis to contain 10.2% water of crystallization. On heating in a capillary tube, it turned bright orange red at 80°–90° C. (dehydration) and decomposed at 180°–182° C.

By conducting the reaction with gaseous hydrogen chloride in methanol a dry product—no water of crystallization—is produced.

Replacement of the 3,6-dihydrazino-s-tetrazine with 3-amino-6-hydrazino s-tetrazine in Example II gives 3-amino-6-hydrazino-s-tetrazine dihydrochloride. Reaction of equimolar quantities of 3,6-dihydrazino-s-tetrazine and nitric acid gives the 3,6-dihydrazino-s-tetrazine mononitric acid salt. Similarly, by employing other acids such as sulfuric and hydrobromic in place of the hydrochloric acid in Example II, the corresponding acid salts are obtained.

Derivatives (ylidenes) having the formula:

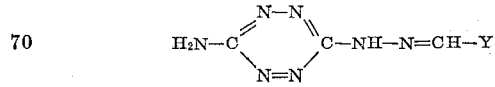

wherein Y is a member selected from the group consisting of hydrogen, alkyl, aryl, substituted alkyl and substituted aryl may be prepared by reacting from about 1 to about 4 moles of a compound having the formula:

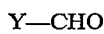

wherein Y has the meaning described above per mole of 3-amino-6-hydrazino-s-tetrazine.

Similarly, derivatives having the formula:

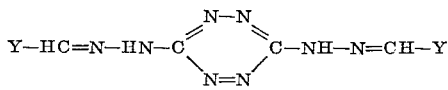

wherein Y has the meaning described above may be prepared by reacting from 2 to about 4 moles of a compound having the formula:

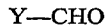

wherein Y has the meaning described above per mole of 3,6-dihydrazino-s-tetrazine. Y is preferably a lower alkyl, that is containing from 1 to about 6 carbon atoms. Typical examples of Y include methyl, ethyl, phenyl, hydroxyphenyl and isopropyl. The reaction of either the mono or dihydrazino tetrazine with the Y—CHO compound can be conducted from about 0° to about 50° C. in the presence or absence of a diluent. Suitable diluents include alcohols, such as methanol, and dimethyl formamide. The solid products may be recovered by any of the common liquid-solid separation means such as decantation, filtration or centrifugation.

EXAMPLE III

A 25 ml. round-bottom flask was charged with 1.0 g. (0.007 mole) of 3,6-dihydrazino-s-tetrazine, 20 ml. methanol, 3 drops of glacial acetic acid, and 2.65 g. (0.025 mole) benzaldehyde. Reaction took place in the cold accompanied by slight evolution of heat and a change in color of the solid from dark red to dull purple. The mixture was refluxed on the steam bath for ten minutes and the product filtered off, washed successively with methanol and ether and air-dried. The crude 3,6-bis(benzylidenehydrazino)-s-tetrazine weighed 2.3 g. (100% of theory) and decomposed at 249°–251° C. It was recrystallized twice from dimethylsulfoxide. The glistening purplish platelets decomposed at 256°–257° C.

| Formula | Carbon, percent | Hydrogen, percent | Nitrogen, percent |
|---|---|---|---|
| $C_{16}H_{14}N_8$: | | | |
| Calculated | 60.37 | 4.43 | 35.20 |
| Found | 60.71 | 4.52 | 35.15 |

When 3,6-dihydrazino-s-tetrazine is replaced by 3-amino-6-hydrazino-s-tetrazine in Example III, 3-amino-6-benzylidenehydrazino-s-tetrazine is produced.

EXAMPLE IV

A 20 ml. round-bottom flask was charged with 1.0 g. (0.007 mole) crude 3,6-dihydrazino-s-tetrazine, 15 ml. methanol, 3 drops of glacial acetic acid in 3.05 g. (0.025 mole) salicylaldehyde. After ten minutes reflux, the product was isolated in the same manner as set forth in Example III. The crude 3,6-bis(salicyclidenehydrazino)-s-tetrazine product weighed 2.3 g. (94% theory) and melted at 283°–287° C. The solid was dull purplish in color. A purified product sample twice recrystallized from dimethylsulfoxide decomposed at 286°–287° C.

Replacement of 3,6-hydrazino-s-tetrazine in Example IV with 3-amino-6-hydrazino-s-tetrazine yields 3-amino-6-salicylidenehydrazino-s-tetrazine.

EXAMPLE V 0.01 mole of 3,6-dihydrazino-s-tetrazine and 0.02 mole acetaldehyde were added to 25 ml. dry dimethylformamide at 10° C. in a vessel equipped with a Dry Ice condenser. After two hours at 25° C. and two additional hours at 50° C. the mixture was concentrated to about 5 ml. The product 3,6-diethylidenehydrazino-s-tetrazine, crystallized out in the form of brown, red clumps.

| Formula | Carbon, percent | Hydrogen, percent | Nitrogen, percent |
|---|---|---|---|
| $C_6H_{10}N_8$: | | | |
| Calculated | 37.1 | 5.18 | 57.7 |
| Found | 37.1 | 5.09 | 55.0 |

When 3-amino-6-hydrazino-s-tetrazine is used in place of 3,6-dihydrazino-s-tetrazine in Example V, 3-amino-6-ethylidenehydrazino-s-tetrazine is obtained.

Hydrazide derivatives having the formulas:

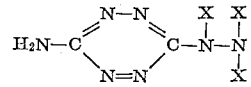

and

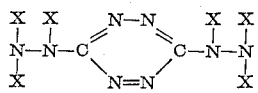

wherein X is a member selected from the group consisting of hydrogen, and acyl radicals may be prepared by reacting 3-amino-6-hydrazino-s-tetrazine or 3,6-dihydrazino-s-tetrazine with an acylating agent such as an acyl anhydride, an acyl halide or a sulfonyl halide. Typical acyl radicals, X, include acetyl, propionyl, butyryl, hexanoyl, benzenesulfonyl, and tosyl. Generally, from one to about eight moles of acylating agent per mole of the s-tetrazine is employed, although a large excess of acylating agent may be employed if desired. The corresponding anhydride or halide can be used in the reaction as for example acetic anhydride, acetyl chloride or benzenesulfonyl chloride. Preferred acyl radicals are those having from 1 to about 6 carbon atoms-lower acyls. In this manner, a wide variety of acyl compounds ranging from a monoacryl to a hexaacyl derivative may be produced. Acylation preferably takes place at a temperature of from about 0° to about 100° C. The solid products may be recovered by any of the common liquid-solid separation means such as decantation, filtration or centrifugation.

EXAMPLE VI 0.7 g. (0.005 mole) of 3,6-dihydrazino-s-tetrazine was added to 10 ml. acetic anhydride at 20° C. The temperature rose to 37° C. and a voluminous orange precipitate soon formed. After thirty minutes, the mixture was filtered and the precipitate was washed with acetic acid. The crude 3,6-diacetylhydrazino-s-tetrazine melted at 254°–260° C. The material was recrystallized first from water and then from aqueous methanol. The purified product melted at 265°–268° C.

Replacement of 3,6-dihydrazino-s-tetrazine with 3-amino-6-hydrazino-s-tetrazine in Example VI gives 3-amino-6-acetyl-hydrazino-s-tetrazine. Also, when butyryl chloride is used in place of acetic anhydride in Example VI above 3,6-dibutyryl-hydrazino-s-tetrazine is obtained. When benzenesulfonyl chloride is used in place of acetic anhydride in Example VI above 3,6-dibenzenesulfonylhydrazino-s-tetrazine is obtained.

EXAMPLE VII 1 g. (0.007 mole) of 3,6-dihydrazino-s-tetrazine was refluxed for fifteen minutes with 15 ml. of acetic anhydride. The dark solution was filtered through glass wool, chilled and poured on top of ice. Hydrolysis of the excess acetic anhydride was accelerated by occasional stirring. After one-half hour, the aqueous layer was decanted from the crude product which was in the form of a semisolid. The latter was stirred with 2-propanol and the salmon power which was obtained was filtered, washed with 2-propanol and air-dried. The crude product was again refluxed with 1.5 ml. acetic anhydride for ten minutes in order to complete the acetylation. On cooling the intense magenta solution, salmon colored crystals separated which were filtered and washed, first with acetic anhydride and then with 2-propanol. Following recrystallization from acetic anhydride purified 3,6-hexaacetylhydrazino-s-tetrazine was recovered.

When hexanoyl bromide is used in place of the acetic anhydride 3,6-hexahexanoylhydrazino-s-tetrazine is obtained. Likewise, when 3-amino-6-hydrazino-s-tetrazine is used in place of the 3,6-dihydrazino-s-tetrazine of Example VII, 3-amino-6-triacetyl-hydrazino-s-tetrazine is obtained.

The azido derivatives having the formulas:

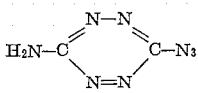

and

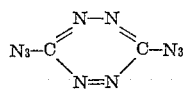

may be prepared by reacting 3-amino-6-hydrazino-s-tetrazine or 3-6-dihydrazino-s-tetrazine with from 1 to about 4 moles of a metal nitrite per mole of the tetrazine compound. Preferably an alkali metal or alkaline earth metal nitrite such as sodium nitrite or magnesium nitrite is used. The reaction is conducted in the presence of a strong acid such as hydrochloric, sulfuric or nitric at a temperature from about −5° to about 15° C. The solid azido derivatives may be recovered by any of the common liquid-solid separation methods such as decantation, filtration and centrifugation.

EXAMPLE VIII 5 ml. of 4 N hydrochloric acid was placed in a large test tube and 0.14 g. (0.001 mole) 3,6-dihydrazino-s-tetrazine was added in small increments. The first portions dissolved quickly with the formation of a yellow-orange color. The last ones formed a yellow precipitate. The mixture was chilled to 2°–3° C. and stirred with a magnetic ball. Over eighteen minutes, 2.5 ml. of 1.0 N (0.0025 mole) sodium nitrite solution was added dropwise at 3°–6° C. An orange precipitate separated soon after the addition was begun. The mixture was then allowed to stand with occasional stirring for thirty minutes at 3°–5° C. The orange solid 3,6-diazido-s-tetrazine was filtered and washed thoroughly with water. A small portion was dried on a porous plate, melting point 128°–130° C.

The main portion of the wet azide was recrystallized by repeatedly pouring hot methanol through the funnel until a substantial quantity appeared to have gone into solution. To the red ethanol solution (estimated 10 ml.) was added about 2 ml. of water. After cooling in ice, the azide was collected as orange, red platelets, melting point 130°–131° C. A sample of the recrystallized azide on an unglazed porcelain plate detonated on contact with the polyethylene spatula.

When 3-amino-6-hydrazino-s-tetrazine is utilized in place of the 3,6-dihydrazino-s-tetrazine of Example VIII, 3-amino-6-azido-s-tetrazine is obtained.

3-substituted pyrazolone 5-yl(1) derivatives having the structures:

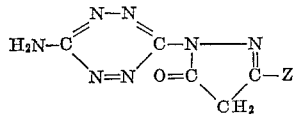

and

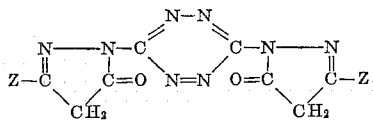

wherein Z is selected from the group consisting of alkyl and aryl radicals, preferably lower alkyl and lower aryl radicals, may be produced by reacting the 3-amino-6-hydrazino-s-tetrazine or 3,6-dihydrazino-s-tetrazine with at least 1 mole of a 1,3-dicarbonyl compound such as aceto acetic ester.

EXAMPLE IX 0.001 mole of 3,6-dihydrazino-s-tetrazine is reacted with 0.01 mole of aceto acetic ester. The product obtained is s-tetrazine (1)-3,6-bis(3-methyl-5-pyrazolone).

The pyrazolones have special utility as pharmaceuticals and photographic dyes or as intermediates for their preparation.

Derivatives having the formulas:

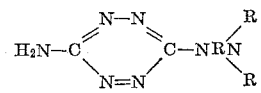

and

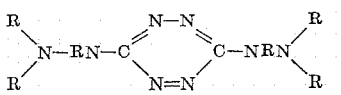

wherein R may be the same or different and is selected from hydrogen, alkyl, aryl, substituted alkyl and substituted aryl may be prepared by reaction of the corresponding hydrazino-s-tetrazine with an alkyl, substituted alkyl, aryl or substituted aryl halide or sulfate or mixtures thereof. Preferred alkyl groups are lower alkyls containing one to about 6 carbon atoms. Typical radicals, R, include methyl, propyl, phenyl, p-chlorophenyl, octyl, benzyl, 2,4-dimethylphenyl and tolyl.

Generally from 1 mole to about 10 moles of sulfate or halide reactant per mole of s-tetrazine may be used to produce from a mono-substituted to a hexa-substituted hydrazino-s-tetrazine.

EXAMPLE X 0.001 mole of 3,6-dihydrazino-s-tetrazine is reacted with .004 mole of ethyl chloride in a diluent. A good yield of 3,6-bis(β,β-diethylhydrazino)-s-tetrazine is obtained.

When 3-amino-6-hydrazino-s-tetrazine is used in place of the 3,6-dihydrazino-s-tetrazine, 3-amino-6-(β,β-diethylhydrazino)-s-tetrazine is obtained.

Reduction of 3-amino-6-hydrazino-s-tetrazine or 3,6-dihydrazino-s-tetrazine results in the 1,2-dihydro derivative according to the following reaction schemes:

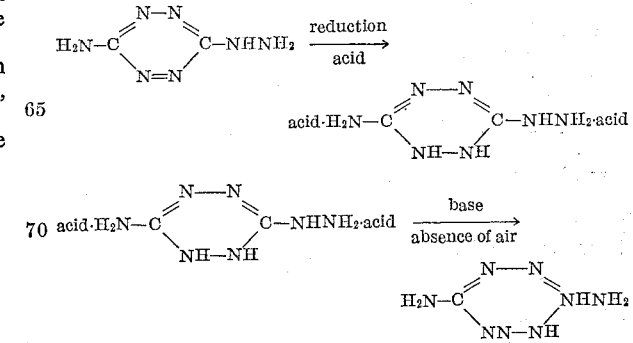

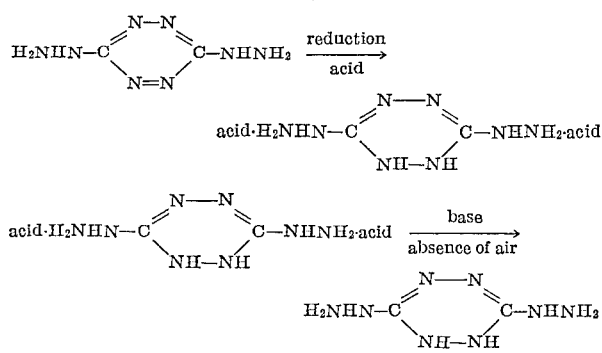

Any mild reducing agent such as stannous chloride, hydrogen sulphide or zinc may be used in the presence of an acid such as hydrochloric, sulfuric, nitric or acetic to form the corresponding acid salt. Greatest yields are obtained, however, when stannous chloride is used as the reducing agent. Generally, from about 1 to about 4 moles of the reducing agent may be used, in the presence of from about 1 to about 4 moles of the acid, per mole of tetrazine compound. An excess of both reducing agent and acid may be employed if desired.

The reduction reaction may be conducted, for example, from about 0° C. to about 150° C. Although atmospheric pressure is preferred, the pressure of this reduction is not critical and pressures up to about 500 atmospheres may be employed. The acid salt is then neutralized in the presence of a water-soluble base such as sodium hydroxide or potassium hydroxide to form the 3-amino-6-hydrazino-1,2-dihydro-s-tetrazine or 3,6-dihydrazino-1,2-dihydro-s-tetrazine. During the reduction step, it is important to exclude air from the reaction mixture. If neutralization is attempted in the presence of air the hydrazino-s-tetrazine is regenerated instead of the hydrazino-1,2-dihydro-s-tetrazine.

EXAMPLE XI 2.8 g. (0.02 mole) of 3,6-dihydrazino-s-tetrazine was added in portions to a solution of 19 g. of stannous chloride dihydrate (0.084 mole) and 30 ml. concentrated hydrochloric acid. A clear colorless solution was obtained in about fifteen minutes. About 10 ml. methanol was added to the solution causing immediate separation of a colorless oil and some crystals. After storage in an ice-box overnight, the oil had solidified. The mixture was filtered and the colorless solid washed with methanol. The solid 3,6-dihydrazino-1,2-dihydro-s-tetrazine dihydrochloride turned salmon at about 165° C. and decomposed near 170° C. It was soluble in water but insoluble in ethanol or concentrated hydrochloric acid. 3 g. (70% of theory) was obtained.

The hydrochloride was dissolved in water and filtered through filter-aid. The volume of clear colorless filtrate was 14 ml. Addition of 12 ml. concentrated hydrochloric acid caused the precipitation of the product hydrochloride which was chilled, filtered and washed with cold 6 N hydrochloric acid. The wet filter cake was dissolved in 6 ml. water and the product precipitated by the addition volume of ethanol. The weight of purified 3,6-dihydrazino-1,2-dihydro-s-tetrazine dihydrochloride was 1.2 g. (40% overall recovery). The product decomposed at 170°–172° C.

In a 2.5 ml. Erlenmeyer flask 0.22 g. (0.001 mole) of 3,6-dihydrazino-1,2-dihydro-s-tetrazine dihydrochloride was dissolved in 3.0 ml. deionized water and chilled with ice during the subsequent purging and neutralization. Nitrogen was then bubbled through this solution for a half hour to purge the solution of any unwanted gases. Nitrogen bubbling was continued during the subsequent neutralization reaction. The 1.0 N aqueous sodium hydroxide solution used for neutralization was also purged with nitrogen for a half hour before use. After about one-half of the theoretical quantity of purged NaOH solution had been added, a colorless solid precipitated which was 3,6-dihydrazino-1,2-dihydro-s-tetrazine monohydrochloride. The addition of base with agitation was continued until the mixture was basic to phenolphthalein. A trace of 3,6-dihydrazino-1,2-dihydro-s-tetrazine dihydrochloride was then added resulting in a colorless mixture which was neutral to litmus. After ten minutes, the faintly pink solid 3,6-dihydrazino-1,2-dihydro-s-tetrazine was filtered off under a nitrogen blanket, washed with water and dried in a vacuum desiccator. Both the wash water and the desiccator had been purged with nitrogen before use.

| Formula | Carbon, percent | Hydrogen, percent | Nitrogen, percent |
| --- | --- | --- | --- |
| $C_2H_8N_8$: | | | |
| Calculated | 16.6 | 5.59 | 77.8 |
| Found | 17.2 | 5.71 | 77.4 |

When 3-amino-6-hydrazino-s-tetrazine is used in place of 3,6-dihydrazino-s-tetrazine in Example XI, 3-amino-6-hydrazino-1,2-dihydro-s-tetrazine is obtained.

A 0.1 g. sample of 3,6-dihydrazino-1,2-dihydro-s-tetrazine dihydrochloride neutralized similarly but with no attempt to exclude air resulted in the exclusive isolation of 3,6-dihydrazino-s-tetrazine identified by its color, decomposition temperature and infrared spectrum.

*Derivatives of 3-amino-6-hydrazino-1,2-dihydro-s-tetrazine and 3,6-dihydrazino-1,2-dihydro-s-tetrazine*

Derivatives (ylidenes) of 3-amino-6-hydrazino-1,2-dihydro-s-tetrazine and 3,6-dihydrazino-1,2-dihydro-s-tetrazine having the formulas:

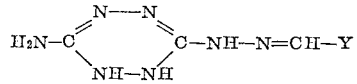

and

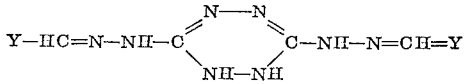

wherein Y has the meaning set forth for the corresponding derivatives of 3-amino-6-hydrazino-s-tetrazine and 3,6-dihydrazino-s-tetrazines, may be prepared in the same manner as set forth previously for 3-amino-6-hydrazino-s-tetrazine and 3,6-dihydrazino-s-tetrazine.

EXAMPLE XII

A 25 ml. round-bottom flask was charged with 8 ml. methanol, 1.15 g. (0.0108 mole) benzaldehyde, 0.42 g. (0.0029 mole) 3,6 - dihydrazino-1,2-dihydro-s-tetrazine and 2 drops glacial acetic acid. Reaction took place upon mixing with slight evolution of heat. After ten minutes of reflux, the mixture was cooled to room temperature and a light tan precipitate of 3,6-bis(benzylidenehydrazino)-1,2-dihydro-s-tetrazine was filtered, washed with methanol and dried under nitrogen. The crude product was recrystallized from glacial acetic acid. The solution was light yellow. Upon cooling, a voluminous, colorless crystalline precipitate separated. The solid was filtered and washed with glacial acetic acid and then with methanol. On contact with the latter, the solid turned into an extremely fine light grey powder. An additional recrystallization from glacial acetic acid-alcohol provided a sample for elemental analysis: melting point 243°–246° C.

| Formula | Carbon, percent | Hydrogen, percent | Nitrogen, percent |
| --- | --- | --- | --- |
| $C_{16}H_{16}N_8$: | | | |
| Calculated | 60.0 | 5.04 | 35.0 |
| Found | 59.9 | 5.20 | 35.0 |

Replacement of the 3,6-dihydrazino-1,2-dihydro-s-tetrazine with 3 - amino - 6-hydrazino-1,2-dihydro-s-tetrazine yields 3 - amino-16-benzylidenehydrazino-1,2-dihydro-s-tetrazine.

Ylidene acid salts may be produced by reacting the acid salt of the corresponding s-tetrazine rather than the s-tetrazine compound as discussed above.

EXAMPLE XIII 3,6-dihydrazino-1,2-dihydro-s-tetrazine dihydrochloride was washed on a funnel with acetone. This treatment was sufficient to effect the formation of the hydrazone. The colorless salt was then reprecipitated three times by dissolving in methanol and adding an equal volume of acetone. The product 3,6-bis(isopropylidenehydrazino)-1,2-dihydro-s-tetrazine dihydrochloride decomposed at 176°–178° C.

Replacement of 3,6-dihydrazino-1,2-dihydro-s-tetrazine with 3-amino-6-hydrazino-1,2-dihydro-s-tetrazine yields 3 - amino-6-isopropylidenehydrazino-s-tetrazine dihydrochloride.

3-substituted pyrazolone-5-yl(1) derivatives may be prepared in the manner set forth for 3-amino-6-hydrazino-s-tetrazine and 3,6-dihydrazino-s-tetrazine by reaction with 1,3-dicarbonyl compounds such as aceto acetic ester.

EXAMPLE XIV

Reaction of 3,6 - dihydrazino - 1,2-dihydro-s-tetrazine with aceto acetic ester yields 1,2-dihydro-s-tetrazine(1)-3,6-bis(3-methyl-5-pyrazolone).

Hydrazide derivatives having the formulas:

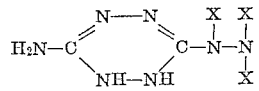

and

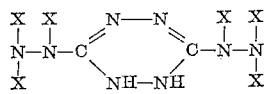

wherein X has the meaning set forth for the corresponding derivatives of 3-amino-6-hydrazino-s-tetrazine and 3,6-dihydrazino-s-tetrazine may be prepared in the same manner as set forth previously for 3-amino-6-hydrazino and 3,6-dihydrazino-s-tetrazine hydrazide derivatives.

EXAMPLE XV 0.002 mole of 3,6-dihydrazino-1,2-dihydro-s-tetrazine is reacted with 5 ml. acetic anhydride. After filtration and washing 3,6-diacetylhydrazino-1,2-dihydro-s-tetrazine is obtained.

When 3 - amino-6-hydrazino - 1,2 - dihydro-s-tetrazine is used in place of 3,6-dihydrazino-1,2-dihydro-tetrazine, 3-amino-6-acetylhydrazino-1,2-dihydro-s-tetrazine is obtained.

Derivatives having the formulas:

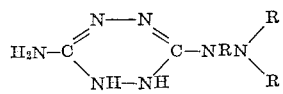

and

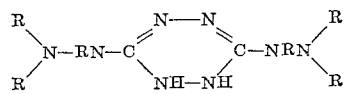

wherein R has the meaning set forth for the corresponding derivatives of 3-amino-6-hydrazino- and 3,6-dihydrazino-s-tetrazine may be prepared in the manner set forth for the 3-amino-6-hydrazino- and 3,6-dihydrazino-s-tetrazine derivatives.

EXAMPLE XVI 0.001 mole of 3,6-dihydrazino-1,2-dihydro-s-tetrazine is reacted with 0.01 mole of methyl chloride. The product 3,6-hexamethylhydrazino-1,2-dihydro-s-tetrazine is recovered.

Replacement of the 3,6-dihydrazino-1,2-dihydro-s-tetrazine with 3-amino-6-hydrazino-1,2-dihydro-s-tetrazine yields 3-amino-6-trimethylhydrazino-s-tetrazine.

Each step of the processes described above is preferably conducted with mild agitation of the reaction mixture although agitation is not critical. Its use, however, is preferred since it produces an even reaction rate. The time required for each step of the above disclosed processes varies depending upon the other reaction variables. In general, however, a time period of from about 5 minutes to twenty-four hours is sufficient.

The examples shown above are in illustration and are not intended to limit the scope of the invention. Parts and percentages are by weight unless otherwise indicated.

The structure of 3,6-dihydrazino-s-tetrazine was established unequivocally by elemental analysis (shown previously) of the compound itself and of several derivatives and by reconversion to 3,6-diamino-s-tetrazine, the starting material. This was accomplished by treating 3,6-dihydrazino-s-tetrazine with nitrous acid to form the diazide, reducing the diazide with stannous chloride to 3,6-diamino-1,2-dihydro-s-tetrazine hydrochloride, and oxidizing the latter in aqueous base to yield a red crystalline solid whose infrared spectrum and melting characteristics proved it to be identical with the starting material, 3,6-diamino-s-tetrazine. Thus, the s-tetrazine ring remained intact during the hydrazinolysis of 3,6-diamino-s-tetrazine and the reconversion of 3,6-dihydrazino-s-tetrazine to 3,6-diamino-s-tetrazine.

The preparation of 3,6-diazido-s-tetrazine from 3,6-dihydrazino-s-tetrazine and nitrous acid was carried out as described above. One millimole of 3,6-dihydrazino-s-tetrazine was used as the starting material in this particular preparation. The wet filter cake of diazidotetrazine was added to a cold solution of stannous chloride in concentrated hydrochloric acid. Immediate gas formation (nitrogen) was noted and a colorless precipitate formed. After chilling the reaction vessel in ice for ten minutes with occasional stirring, the product was filtered and washed with cold concentrated hydrochloric acid.

The colorless salt was dissolved in water, the solution was chilled, and made basic by the dropwise addition of one normal sodium hydroxide solution. Almost immediately bright red crystals separated from the mixture. The product was filtered, washed with water and alcohol and air-dried. It did not melt up to 300° C. although some sublimation was noted near 220° C. This behavior is characteristic of 3,6-diamino-s-tetrazine. Its infrared spectrum was identical in every respect with that of authentic 3,6-diamino-s-tetrazine.

The nature of the reduction product prepared above was independently established as 3,6-diamino-1,2-dihydro-s-tetrazine hydrochloride by the reaction of 3,6-diamino-s-tetrazine with stannous chloride in hydrochloric acid. The colorless reduction product was filtered and washed with hydrochloric acid and then with ethanol. It decomposed at 220°–225° C. and reduced Fehling's solution in the cold. The addition of ammonium hydroxide to an aqueous solution of the salt caused precipitation of red crystals of 3,6-diamino-s-tetrazine further identified by its melting characteristics.

Although the compounds of my invention have been separately discussed for ease of discussion, the compounds belong to a class represented by the formulas:

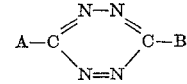

wherein A is selected from the group consisting of amino (—NH$_2$), hydrazino (—NHNH$_2$), hydrazinium salt (—NHNH$_2$·acid), ylidenehydrazino (—NHN=CH—Y)

azido (—N₃), hydrazide (—NXNX₂), 3-substituted pyrazolone-5-yl(1),

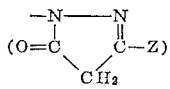

(—NRNR₂), and B is selected from the group consisting of: hydrazino, (—NHNH₂), hydrazinium salt (—NHNH₂·acid)

ylidenehydrazino (—NHN=CH—Y), azido (—N₃), hydrazide (—NXNX₂), 3-substituted pyrazolone-5-yl(1)

and (—NRNR₂) wherein X, Y, Z, and R have the meanings previously set forth in the specification.

Another class of my compounds are represented by the formula:

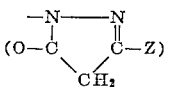

wherein D is selected from the group consisting of: amino (—NH₂), hydrazino (—NHNH₂), hydrazinium salt (—NHNH₂·acid), hydrazide (—NXNX₂), 3-substituted pyrazolone-5-yl(1)

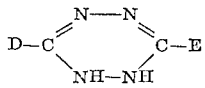

and (—NRNR₂) and E is selected from the group consisting of: hydrazino (—NHNH₂), hydrazinium salt (—NHNH₂·acid), ylidenehydrazino (—NHN=CH—Y), ylidenehydrazinum salt —NHN=CH—Y·acid), hydrazide (—NXNX₂), 3-substituted pyrazolone-5-yl(1)

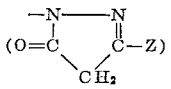

and (—NRNR₂) and wherein X, Y, Z, and R have the meanings previously set forth in the specification.

Having fully described the compounds, their mode of preparation and their many utilities, it is desired that the invention be limited only by the scope of the appended claims.

I claim:

1. Compound selected from the group consisting of those having the formula:

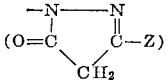

wherein A is a member selected from the group consisting of amino, hydrazino, hydrazinium strong acid salt, azido, 3-lower alkyl pyrazolone-5-yl(1),

—NHN=CH—Y

—NXNX₂, and —NRNR₂; and B is a member selected from the group consisting of hydrazino, hydrazinium strong acid salts, azido, 3-lower alkyl pyrazolone-5-yl(1), —NHN=CH—Y, —NXNX₂, and —NRNR₂; and compounds having the formula:

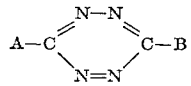

wherein D is a member selected from the group consisting of amino, hydrazino, hydrazinium strong acid salt, 3-lower alkyl pyrazolone-5-yl(1), —NHN=C—Y,
—HHN=CH—Y·acid —NXNX₂, and —NRNR₂; E is a member selected from the group consisting of hydrazino, hydrazinium strong acid, 3-lower alkyl pyrazolone-5-yl(1), —NHN=CH—Y, —NHN=CH—Y·acid, —NXNX₂, and —NRNR₂; X is selected from a group consisting of hydrogen and lower alkanoyl; Y is selected from the group consisting of hydrogen, lower alkyl, phenyl, and hydroxyphenyl; R is selected from the group consisting of hydrogen, lower alkyl, phenyl, p-chlorophenyl, 2,4-dimethylphenyl, and tolyl.

2. 3,6-bis(benzylidenehydrazino)-s-tetrazine.
3. 3,6-bis(salicylidenehydrazino)-s-tetrazine.
4. 3,6-diethylidenehydrazino-s-tetrazine.
5. 3,6-diacetylhydrazino-s-tetrazine.
6. 3,6-hexaacetylhydrazino-s-tetrazine.
7. s-Tetrazine (1)-3,6-bis(methyl-5-pyrazolone).
8. 3,6-bis(β,β-diethylhydrazino)-s-tetrazine.
9. 3,6-dihydrazino-1,2-dihydro-s-tetrazine dihydrochloride.
10. 3,6-dihydrazino-s-tetrazine dihydrochloride.
11. 3,6-diazido-s-tetrazine.
12. 3,6-dihydrazino-s-tetrazine.
13. 3,6-dihydrazino-1,2-dihydro-s-tetrazine.
14. The process which comprises forming a compound selected from the group consisting of

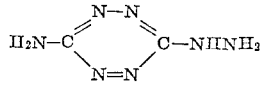

and

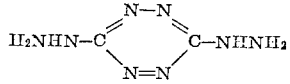

by reacting 3,6-diamino-s-tetrazine with hydrazine.

15. The process which comprises forming a compound selected from the group consisting of 3-amino-6-hydrazino-1,2-dihydro-s-tetrazine and 3,6-dihydrazino-1,2-dihydro-s-tetrazine, by reducing in the presence of a strong acid a compound selected from the group consisting of 3-amino-6-hydrazino-s-tetrazine and 3,6-dihydrazino-s-tetrazine to form the acid salt and subsequently neutralizing the acid salt in the absence of air.

16. The process which comprises producing a compound selected from the group consisting of:

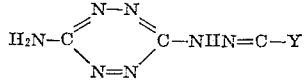

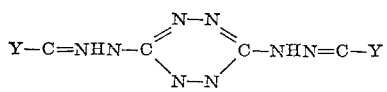

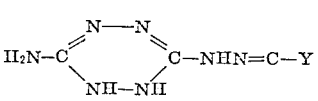

and

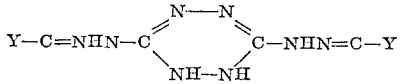

by reacting a compound selected from the group consisting of 3-amino-6-hydrazino-s-tetrazine, 3,6-dihydrazino-s-tetrazine, 3-amino-6-hydrazino-1,2-dihydro-s-tetrazine and 3,6-dihydrazino-1,2-dihydro-s-tetrazine, with a compound having the formula: Y—CHO wherein Y is a member selected from the group consisting of hydrogen, lower alkyl, phenyl and hydroxyphenyl.

17. The process which comprises producing a compound selected from the group consisting of 3-amino-6-azido-s-tetrazine and 3,6-diazido-s-tetrazine, by reacting a compound selected from the group consisting of 3- amino-6-hydrazino-s-tetrazine and 3,6-dihydrazino-s-tetrazine with a metal nitrite in the presence of a strong acid.

18. The process which comprises producing a compound selected from the group consisting of

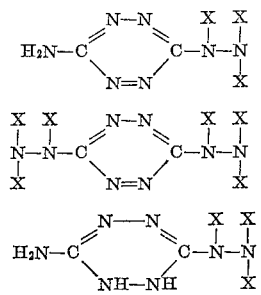

and

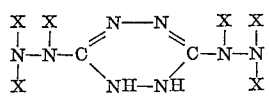

wherein X is a member selected from the group consisting of hydrogen and lower acyl by reacting a compound selected from the group consisting of 3-amino-6-hydrazino-s-tetrazine, 3,6-dihydrazino-s-tetrazine, 3-amino-6-hydrazino-1,2-dihydro-s-tetrazine and 3,6-dihydrazino-1,2-dihydro-s-tetrazine with an acylating agent.

19. The process which comprises producing a compound selected from the group consisting of

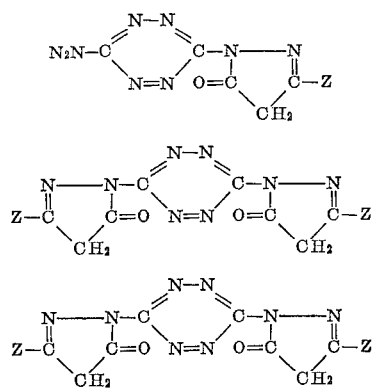

and

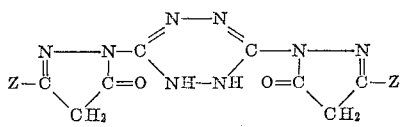

wherein Z is lower alkyl, by reacting a member selected from the group consisting of 3-amino-6-hydrazino-s-tetrazine, 3,6-dihydrazino-s-tetrazine, 3-amino-6-hydrazino-1,2-dihydro-s-tetrazine and 3,6-dihydrazino-1,2-dihydro-s-tetrazine with a 1,3-dicarbonyl compound.

20. The process which comprises producing a compound selected from the group consisting of

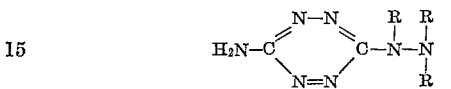

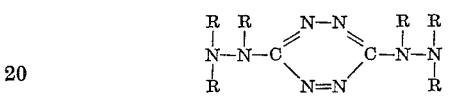

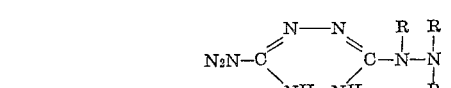

and

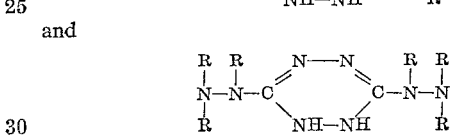

wherein R is selected from the group consisting of hydrogen, lower alkyl, phenyl, p-chlorophenyl, 2,4-dimethylphenyl and tolyl, by reacting a member selected from the group consisting of 3-amino-6-hydrazino-s-tetrazine, 3,6-dihydrazino-s-tetrazine, 3-amino-6-hydrazino-1,2-dihydro-s-tetrazine, and 3,6-dihydrazino-1,2-dihydro-s-tetrazine with a member selected from the group consisting of lower alkyl halides, lower alkyl sulfates, phenyl halides, p-chlorophenyl halides, 2,4-diphenylmethyl halides, tolyl halides, phenyl sulfates, p-chlorophenyl sulfates, 2,4-dimethylphenyl sulfates, tolyl sulfates, and mixtures thereof.

No references cited.

WALTER A. MODANCE, *Primary Examiner.*

NICHOLAS S. RIZZO, *Examiner.*